United States Patent

Cuervo

[11] Patent Number: 6,105,009
[45] Date of Patent: Aug. 15, 2000

[54] AUTOMATED TELLER MACHINE DISPENSER OF DEBIT CARDS

[76] Inventor: Vincent Cuervo, 4520 Sunset Rd., Miami, Fla. 33143

[21] Appl. No.: 09/128,088

[22] Filed: Aug. 3, 1998

Related U.S. Application Data

[63] Continuation-in-part of application No. 08/877,006, Jun. 16, 1997.

[51] Int. Cl.[7] .............................. G06F 17/60; G06F 7/08
[52] U.S. Cl. .............................. 705/43; 705/17; 705/35; 705/39; 705/42; 705/43; 705/44; 235/375; 235/379; 235/380; 235/381; 379/91.01; 379/114; 379/144
[58] Field of Search .............................. 705/41, 42, 43, 705/17, 44, 35, 39, 23; 235/380, 379, 375; 283/67, 101, 57; 379/114, 144, 91.01

[56] References Cited

U.S. PATENT DOCUMENTS

| | | | |
|---|---|---|---|
| 5,440,108 | 8/1995 | Tran et al. | 235/381 |
| 5,477,037 | 12/1995 | Bergen | 235/379 |
| 5,585,787 | 12/1996 | Wallerstein | 383/67 |
| 5,673,309 | 9/1997 | Woynoski | 379/144 |
| 5,678,937 | 10/1997 | Smith | 235/379 |
| 5,696,908 | 12/1997 | Muehlberger et al. | 705/39 |
| 5,787,404 | 7/1998 | Fernandez-Holmann | 705/35 |
| 5,949,043 | 9/1999 | Hayashida | 235/379 |
| 5,952,639 | 9/1999 | Ohki et al. | 235/379 |
| 5,955,961 | 9/1999 | Wallerstein | 235/380 |
| 6,006,988 | 12/1999 | Behrmann et al. | 235/379 |

FOREIGN PATENT DOCUMENTS

| | | |
|---|---|---|
| 984402 A2 | 3/2000 | European Pat. Off. . |
| WO 9826376 | 6/1998 | WIPO . |

OTHER PUBLICATIONS

"A New Card Dispenser gives The Unbanked A Debit Option", Debit Card New, Apr. 27, 1998.
"Default Proof Credit Card System Inc. Announces Favorable Office Action for Debit Card ATM Dispenser", Business Wire, Jun. 24, 1998.
"Unbanked Debit", Card Fax, Apr. 20, 1998.
"The Unpaid Travel Card Alternative For Vacationer On A Budget", Debit Card New, Jun. 30, 1997.
"Tidel Automated Teller Machines to Feature Breakthrough Prepaid Phone Card Software", PR Newswire, Jan. 21, 1999.
"How Fare Cards Could Pay For More Than Just Transportation", POS News, Nov. 1991.

*Primary Examiner*—James P. Trammell
*Assistant Examiner*—Nga B. Nguyen
*Attorney, Agent, or Firm*—J. Sanchelima

[57] ABSTRACT

An automated machine for dispensing debit cards that includes an automated teller machine (ATM) with input and output capabilities and a dispenser for debit cards that include each one unique identification number on a storage member thereon. A user enters his or her particulars and those of the transaction which are merged with one of the unique identification numbers and transmitted to a remote computer facility that acts as a clearing house for the users' transactions. The remote facility includes input and output means to communicate with the debit card dispenser and the associated circuitry to obtain the identification numbers of the debit cards being dispensed and the particulars of the users and the transactions. Adequate software is provided in the remote facility to permit users to accesss the same line of credit opened for one or more debit cards so that different users can remotely access and affect one or more lines of credit.

8 Claims, 2 Drawing Sheets

AUTOMATED TELLER MACHINE DISPENSER OF DEBIT CARDS

OTHER RELATED APPLICATIONS

The present application is a continuation-in-part of pending of U.S. patent application Ser. No. 08/877,006, filed on Jun. 16, 1997, which is hereby incorporated by reference.

BACKGROUND OF THE INVENTION

1. Field of the Invention

The present invention relates to dispensers of debit cards, and more particularly, to those that are computerized and use an automated teller machine.

2. Description of the Related Art

Applicant believes that the closest reference corresponds to U.S. Pat. No. 5,696,908 to Muehlberger (1997) for a telephone debit card dispenser and method. However, it differs from the present invention because it does not disclose the use of ATM machines to provide debit cards with any selected line of credit that can be used with more than one card to transfer funds, nor means to provide incentives to the user for having balances on their debit cards.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a system for dispensing and controlling debit cards that require a minimum of paperwork, maintenance and financial disclosure from a card purchaser.

It is another object of this invention to provide a system that permits a user to acquire such debit cards from widely available ATMs (automated teller machine) using cash, debit and/or credit cards.

It is yet another object of the present invention to permit a user to obtain more than one debit card associated with the same identifying serial number for accepting deposits and withdrawals to readily effect transfers of funds to remote locations, including foreign countries.

It is still another object of the present invention to provide a system that is transportable from one ATM machine to another and that permits a debit card issuer to selectively offer valuable incentives to a user for either using or not using the debit card, in specific situations or geographical areas.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
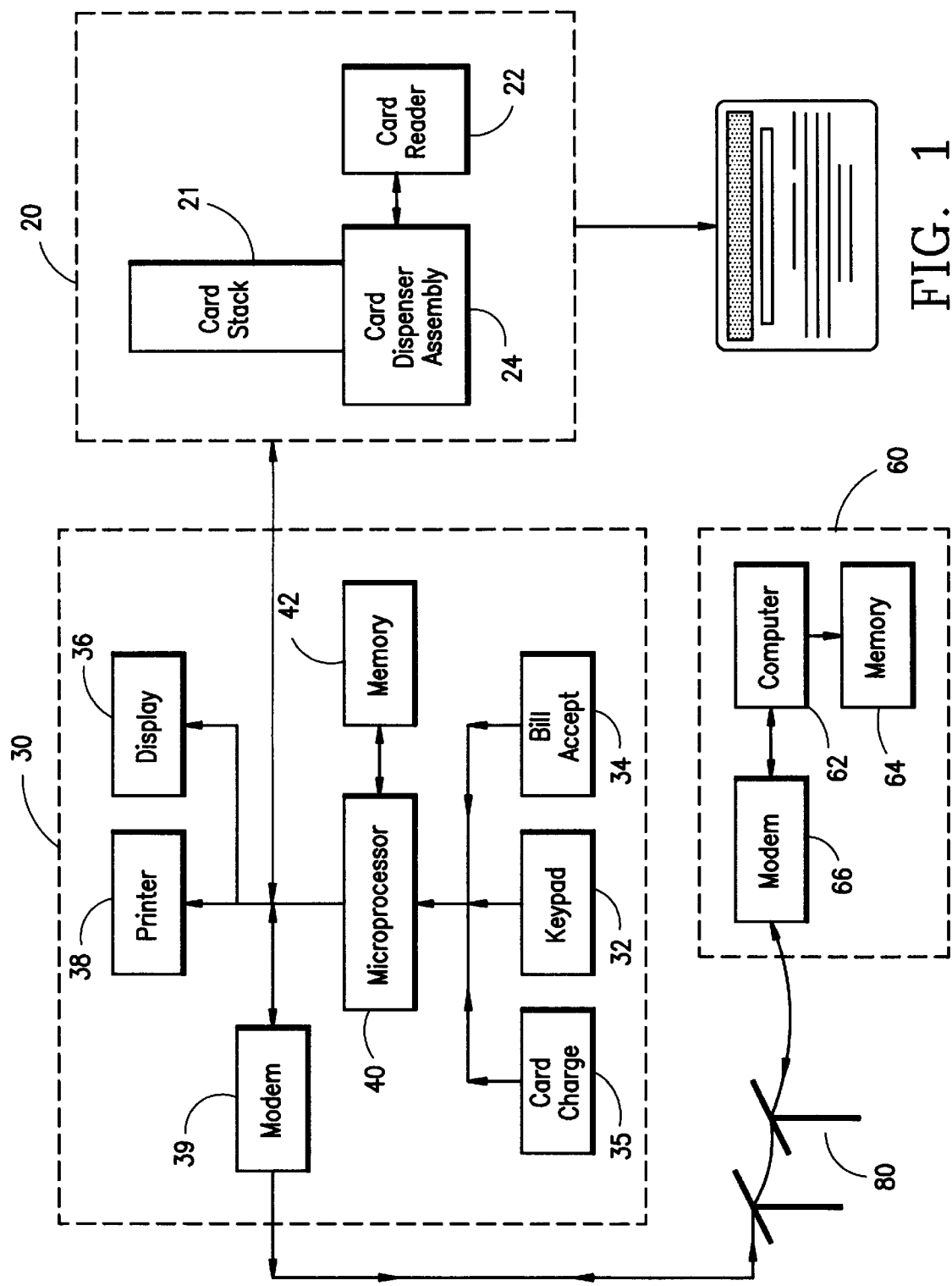
FIG. 1 represents a block diagram of the system hardware used in one of the preferred embodiments for the present invention.

Referring now to the drawings, where the present invention is generally referred to with numeral 10, it can be observed that it basically includes a system for dispensing and controlling debit cards and it includes basically debit card dispenser 20, automatic teller machine (ATM) assembly 30 computerized clearinghouse 60 and a telecommunications network 80 connecting them. For the purposes of this application, a user will be deemed a debit card purchaser or holder. An issuer will be the entity issuing the debit cards. Dispenser 20 is loaded with a stack 21 of debit cards 22 with a digital storage member 24 wherein a unique identifying serial number has been recorded. Dispenser 20 includes an ATM assembly 30 with the necessary input and output hardware, such as keypad 32, bill acceptance assembly 34, card charge assembly 35, display 36, printer assembly 38, computer assembly 40 and associated storage assembly 42.

Figure 2:
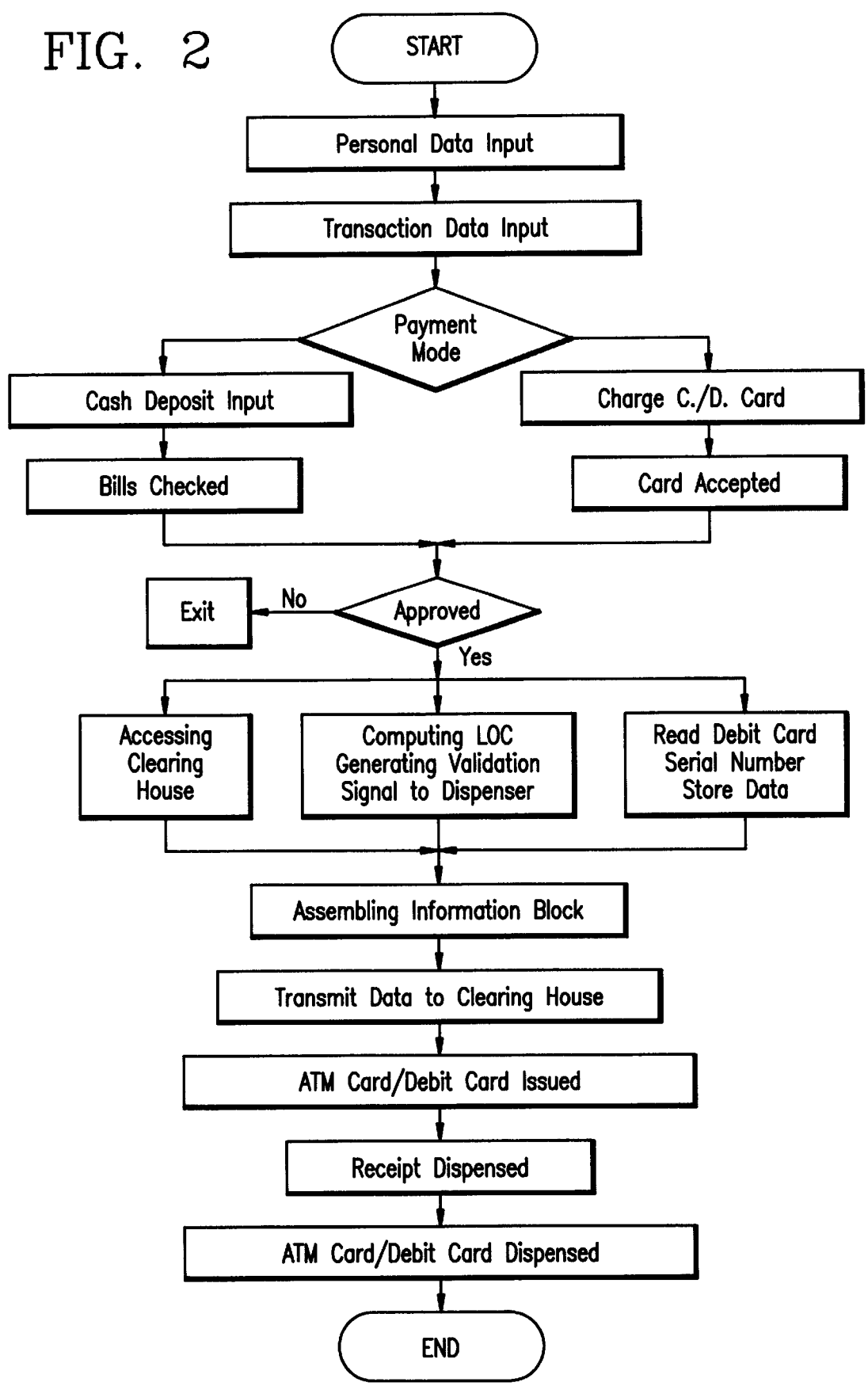
FIG. 2 represents an algorithm for the steps required to dispense a debit card.

As shown in FIG. 2, a debit card purchaser initiates the process by entering his or her basic personal information which, depending on the jurisdiction's regulations, may be obviated (bearer debit card) or may require disclosure of the name, address, social security number, mother's maiden name, PIN (personal identification number), etc. The user of the system determines the amount of information it will require, or make optional, leaving latitude for the purchaser as to how much information he or she wants to disclose. The more information he or she discloses the more secure the debit card will be. Also, a card purchaser will have the ability to restrict maximum daily (or other suitable time period) withdrawals with a particular PIN number requiring other PIN numbers for other maximum allowances. In sum, the card purchaser has the ability to design the terms of withdrawal from the debit card to fit his or her objectives. The information entered by the debit card purchaser is stored in storage assembly 42 through computer assembly 40 for subsequent transmission to clearinghouse 60, as shown in FIG. 1.

The next step pertains to entering information about the transaction such as the amount to be deposited/withdrawn and method of payment (cash, debit or credit card). If the transaction is a deposit, the bills are validated or the debit/credit cards verified in a conventional manner by electronically contacting clearinghouse 40 which in turn connects with the credit/debit card issuer (not shown) in a conventional manner. If the transaction includes a request for one or more debit cards, then computer assembly 40 reads the serial numbers for each of the cards and assembles this information in storage assembly 42. If more than one card are dispensed, then the serial numbers will be linked to each other with the software making them look as if they were only one number. In this manner, a card purchaser may give one or more cards to others (child in college, traveling salesperson, etc.) who will be able to use the debit card within the available line of credit. The card purchaser can then replenish the line of credit for the others' remote usage, thus effectively constituting an instantaneous transfer of funds.

The particulars of the user and the transaction, as well as the serial number(s) of the debit card(s) being dispensed, are assembled in a predetermined manner and forwarded through network 80 to clearing house 60.

If the transaction is a withdrawal, clearinghouse 60 determines whether the requested funds are within the line of credit of the card owner. Optionally, a PIN number or any other verification information may be required, to enhance the security of the transaction, depending on how lax the system is designed to be and the optional precautionary steps taken by the card purchaser. The purchaser can also shape how elaborate his/her security system will be.

Computerized clearinghouse 60 includes computer assembly 62 with associated storage assembly 64, and telecommunication circuitry 66 for sending and receiving data through network 60. Program instructions and data are stored in storage assembly 64 to permit a user to keep track of the debit card serial numbers of each of the debit cards 22 dispensed, as well as the line of credit issued to each card depending on the funds deposited by a card purchaser.

Additionally, the software in assembly 64 may include instructions to provide incentives to the users, such as the payment of interest for said line of credit balances. The software will permit receiving/disbursement of funds from and to any holder of the linked credit cards, with or without additional security conditions that will be stored in storage assembly 64.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An automated machine for dispensing debit cards, comprising:

A) an automated teller machine assembly including first computer means with associated first storage means that further include input and output means for entering information from a user pertaining to his or her particulars and the particulars of the transaction in said first storage means, said first input means includes a keypad assembly, a bill acceptance port and a credit/debit card charge assembly and further including means for validating the funds made available through said input means so that a line of credit is computed by said first computer means and stored in said first storage means with a validation signal and a block of information is assembled and ready for transmission;

B) means for dispensing at least one debit card for each transaction, and each of said debit cards including means for storing a unique identification number, and said debit cards being dispensed only after a first predetermined number of conditions have been met and said validation signal is received from said automated teller machine; and C) a remotely located computerized clearing house assembly, including second computer means with associated second storage means, second input and output means for receiving and sending said block of information from and to said automated teller machine and said second storage means further including data and instructions to process said block of information so that a line of credit is entered for each of said identification numbers.

2. The automated machine for dispensing debit cards set forth in claim 1, wherein the instructions and data in said second storage means permit a user to link more than one of said identification numbers of said debit cards to one line of credit thereby permitting more than one users to simultaneously access said credit line.

3. The automated machine set forth in claim 2 wherein the instructions and data in said second storage means permits an issuer to affect the line of credit of the users upon the occurrence of a second number of predetermined conditions.

4. The automated machine set forth in claim 3 wherein said second number of predetermined conditions includes the passage of time with unused balances.

5. The automated machine set forth in claim 4 wherein the users can send and receive funds through the use of linked debit cards over a network of remotely distributed ATM assemblies.

6. The automated machine set forth in claim 3, wherein said second number of predetermined conditions includes the use of said debit cards in predetermined geographic locations.

7. The automated machine set forth in claim 6 wherein said line of credit is calculated in one or more pre-selected currencies.

8. The automated machine set forth in claim 7 wherein predetermined incentives are added to said line of credit, selectively, upon the occurrence of said second number of predetermined conditions.

* * * * *